(12) United States Patent
Kwiatkowski (10) Patent No.: US 7,245,640 B2
(45) Date of Patent: Jul. 17, 2007

(54) PACKET ORIGINATION

(75) Inventor: Jacek Kwiatkowski, Damroki (PL)

(73) Assignee: Intel Corporation, Santa Clara, CA (US)

( * ) Notice: Subject to any disclaimer, the term of this patent is extended or adjusted under 35 U.S.C. 154(b) by 1092 days.

(21) Appl. No.: 10/322,886

(22) Filed: Dec. 18, 2002

(65) Prior Publication Data

US 2004/0120355 A1 Jun. 24, 2004

(51) Int. Cl.
*H04L 12/54* (2006.01)
*H04J 3/12* (2006.01)

(52) U.S. Cl. ............. 370/528; 370/401; 370/506; 709/238

(58) Field of Classification Search ............. 370/221, 370/351–400, 474, 506, 527–529, 401; 709/241–249, 709/238
See application file for complete search history.

(56) References Cited

U.S. PATENT DOCUMENTS 5,721,819 A * 2/1998 Galles et al. ............ 709/243
2002/0004843 A1 * 1/2002 Andersson et al. ......... 709/238

\* cited by examiner

*Primary Examiner*—Afsar Qureshi
(74) *Attorney, Agent, or Firm*—Buckley, Maschoff & Talwalkar LLC (57) ABSTRACT

A method, apparatus, and system for originating a packet.

29 Claims, 7 Drawing Sheets

Dynamic Network Routing Device

PACKET ORIGINATION

BACKGROUND OF THE INVENTION

In certain computer networks including, for example, the Internet, routers are utilized to determine efficient routing for information transmitted across the network. Various routing protocols exist for determining efficient routes including, for example, distance vector protocol and open shortest path first protocol. In such routing protocols, routing messages may need to be sent, for example, to determine efficiency of certain routes and to communicate rout information from one router to another router. Thus, there may be a need for an efficient, robust system, apparatus, and method for creating or originating routing messages.

BRIEF DESCRIPTION OF THE DRAWINGS

The subject matter regarded as embodiments of the invention is particularly pointed out and distinctly claimed in the concluding portion of the specification. Embodiments, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks.

The present dynamic network routing techniques provide solutions to the shortcomings of certain network routing techniques, wherein routing is determined, for example, by a link state routing protocol. Those of ordinary skill in computer network technology will readily appreciate that the dynamic network routing techniques, while described in connection with link state advertisements is equally applicable to filling fields of limited size with one or more pieces of information in other applications. Other details, features, and advantages of the dynamic network routing techniques will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

The Internet is a network of nodes such as computers, dumb terminals, or other typically processor-based, devices interconnected by one or more forms of communication media. Typical interconnected devices range from handheld computers and notebook PCs to high-end mainframe and supercomputers. The communication media coupling those devices include twisted pair, co-axial cable, optical fibers and wireless communication techniques such as use of radio frequency.

Dynamic routing protocols are utilized in data networks such as the Internet, wide area networks, or local area networks to discover routes through the data network, communicate the discovered routes to routers, and transmit packets along those routes. Link state routing protocols maintain a routing table in a database that contains information related to the topology of a network such as, for example, the Internet, a wide area network, or a local area network. Alternately, a portion of a network, called an internetwork or area, may be the extent of topology considered in a particular link state network. The topology information retained by link state routers is generally related to routers and router interconnections beyond neighboring routers. The information contained in the database is acquired by the exchange of link state packets, called link state advertisements ("LSAs"), with directly coupled routers.

In a certain dynamic routing protocol, a shortest path first algorithm is used to compute the reachability of destinations coupled to the network. Thus, link state routing protocols are known generally as shortest-path first protocols. A commonly used example of a link state routing protocol is Open Shortest-Path First Interior Gateway Protocol ("OSPF Protocol"). Once a router has a complete database of information for each segment of the internetwork that may be used for routing, the router typically analyzes all possible routes to each destination on the internetwork and fills its routing table with the best route to each destination. Each router thus generates a shortest-path-first tree of the internetwork with itself at the root of the tree. Reachability includes such network metrics or performance characteristics as hop count, throughput, and latency.

In an embodiment, an LSA is a unit of data describing the local state of one or more routers or networks. For a router, that local state includes the state of the router's interfaces and adjacencies. An interface is a connection between a router and one of its attached links, while an adjacency is a relation established between certain neighboring routers that have synchronized link state databases. Each LSA is typically flooded or distributed to other routers. Flooding distributes and synchronizes the link-state database between OSPF routers. The collected LSAs of all routers and networks forms the link state database of the protocol. In an embodiment, the LSA unit of data may be a packet having a 60-byte header and a total of 1280 bytes.

OSPF networks are typically divided into multiple internetworks or areas. Intra-area routing occurs when the source and destination nodes are in the same area, while inter-area routing occurs when the source and destination nodes are in different areas.

Figure 1:
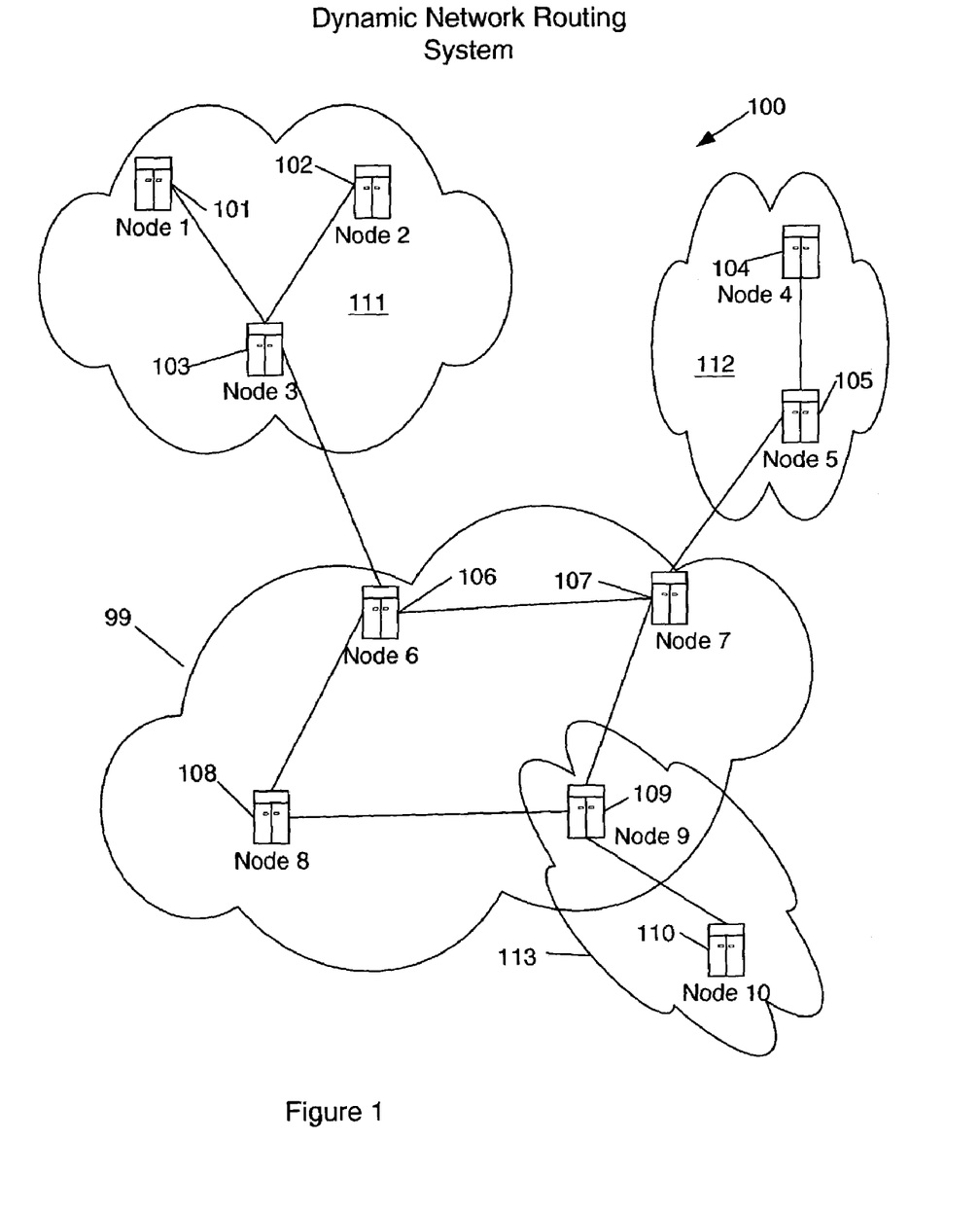
FIG. 1 is a block diagram of a system suitable for practicing an embodiment of the invention.

Link state routing protocols are capable of discovering changes in a network topology that may be caused by, for example, component failure or addition of new components to the network. Thus, link state advertisements are typically triggered to be sent by a router to other routers in the network by a change in a network rather than running at frequent periods. LSAs may also be sent periodically, but typically are sent less frequently than, for example, messages may be sent in a distance vector protocol. Each time an LSA is received at a router, the router typically recalculates best routes to each destination using the information received in the LSA and updates the routing table for that router FIG. 1 illustrates a dynamic network routing system 100 in which embodiments of the present invention may be implemented. Node 1 101, node 2 102 and node 3 103 are nodes in area 1 111 of the dynamic network routing system 100. Node 4 104 and node 5 105 are nodes in area 2 112 of the dynamic network routing system 100. Node 9 109 and node 10 110 are nodes in area 3 113 of the dynamic network routing system 100. Node 6 106, node 7 107, node 8 108, and node 9 109 may be viewed as being nodes on a backbone 99, wherein the backbone 99 is responsible for distributing information between areas.

Network nodes 101-110 may be equipped with appropriate hardware, firmware, or software to communicate information in accordance with one or more protocols. A protocol may comprise a set of instructions by which the information is communicated over the communications medium. Protocols are, furthermore, often layered over one another to form something called a "protocol stack." In an embodiment of the invention, the network nodes 101-110 operate in accordance with version 3 of OSPF Protocol that operates with version 6 of the Internet Protocol ("IPv6"). That OSPF Protocol is defined by the Internet Engineering Task Force ("IETF"), in Request for Comment (RFC) 2740.

OSPF does not define a way to fragment protocol packets and so must depend on IPv6 fragmentation when transmitting packets larger than the link maximum transmission unit. It is furthermore recommended in RFC 2740 that IPv6 fragmentation should be avoided when using OSPF version 3. No apparatus, system, or method for assigning router information into many link state advertisements has been proposed, however.

Embodiments of the present invention, therefore, provide apparatuses, systems, and methods for originating LSAs. In an embodiment, those LSAs have an upper size limit which may be, for example, 1220 bytes. That 1220 byte limit is less than the maximum transmission unit size for an IPv6 port. An LSA having a size that does not exceed 1220 bytes and that is encapsulated in an OSPFv3 Link State Update packet will be transmitted in every IPv6 link without fragmentation because that 1220 byte limit plus OSPv3 and IPv6 headers not greater than 1280 bytes. Thus, every link state advertisement in the IPv6 network that is limited to a maximum transmission size of 1220 bytes will be sent in a single unfragmented packet and any link or group of links that exceeds 1220 bytes would be fragmented into at least two packets.

Those LSAs may also be assigned information related to multiple interfaces and neighboring routers, wherein a router is any node that may be utilized in sending information through a network. Thus, for example, an LSA may be limited to 1220 bytes and have information for as many interfaces and neighboring routers as may be contained in the data portion of a 1220 byte message inserted therein.

Those LSAs may also be reorganized for optimal operation. Links between LSAs and interfaces may be tracked. Thus, for example, when, an interface state, adjacencies or configuration is changed, only the LSA that describes the changed interface is originated. Origination of an LSA indicates that the LSA is transmitted on the network.

The nodes 101-110 may be source nodes, destination nodes, intermediate nodes or a combination of those source nodes, destination nodes and intermediate nodes. Information is transmitted across the network from source nodes to destination nodes, often through one or more intermediate nodes. Routers are a type of node that generally determine how information is to be routed from source nodes to destination nodes. Routers also commonly act to receive and transmit information.

Information may comprise any data capable of being represented as a signal, such as an electrical signal, optical signal, acoustical signal and so forth. Examples of information in this context may include data related to metrics associated with a router, data related to metrics related to data transfer between routers, and so forth.

Nodes may include a processor or a computer coupled to a network such as, for example, the Internet. Each node may communicate with other nodes on the network by way of, for example, IPv6.

Figure 2:
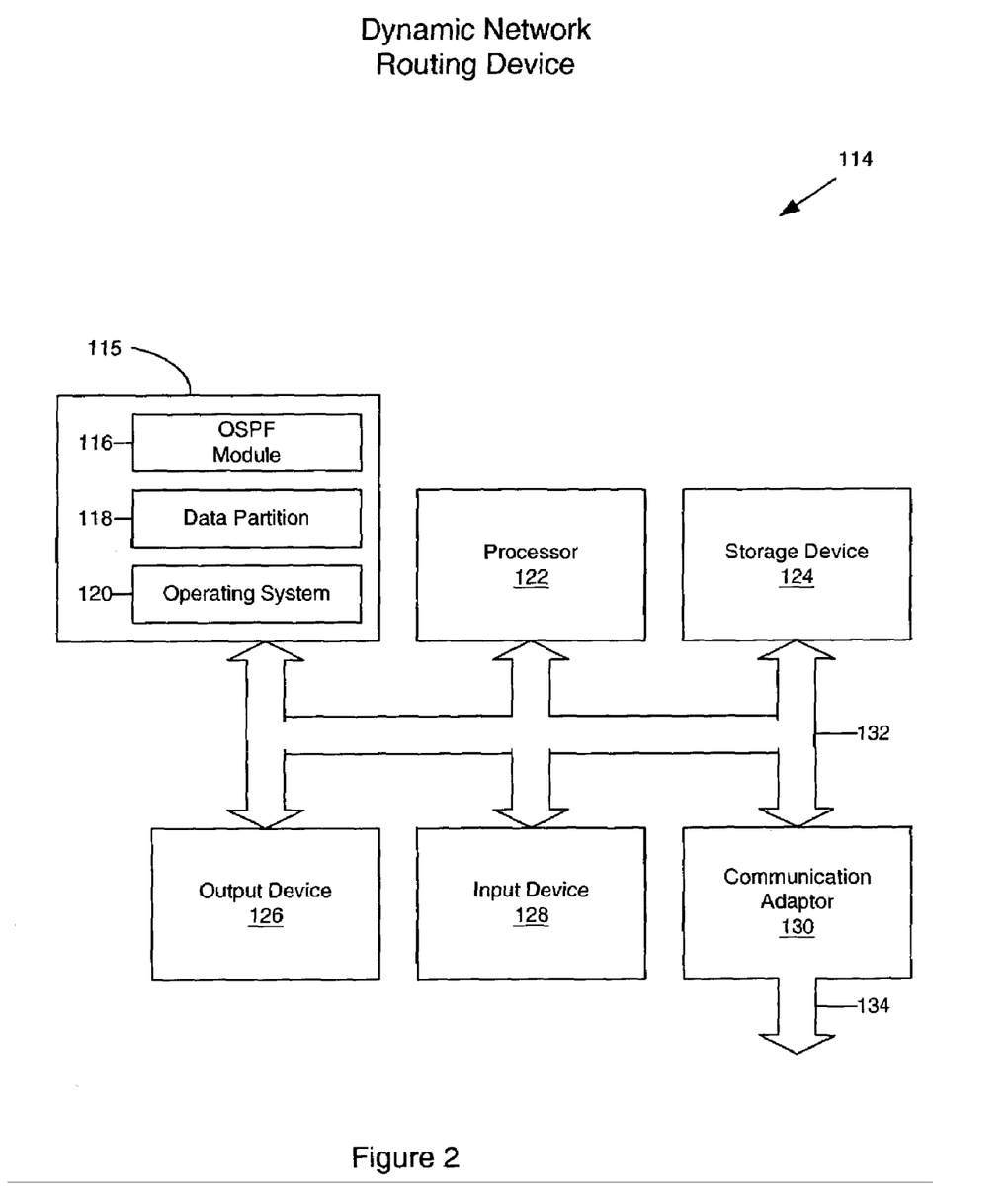
FIG. 2 is a block diagram of a device suitable for practicing an embodiment of the invention.

FIG. 2 illustrates a dynamic network routing device 114 of an embodiment in which dynamic network routing is performed in a router. That dynamic network routing device 114 includes memory 115, a processor 122, a storage device 124, an output device 126, an input device 128, and a communication adaptor 130. Communication between the processor 122, the storage device 124, the output device 126, the input device 128, and the communication adaptor 130 is accomplished by way of one or more communication busses 132. It should be recognized that the dynamic network routing device 114 may have fewer components or more components than shown in FIG. 2. For example, if a user interface is not desired, the input device 128 or output device 126 may not be included with the dynamic network routing device 114.

The memory 115 may, for example, include random access memory (RAM), dynamic RAM, and/or read only memory (ROM) (e.g., programmable ROM, erasable programmable ROM, or electronically erasable programmable ROM) and may store computer program instructions and information. The memory 115 may furthermore be partitioned into sections in which operating system 120 instructions are stored, a data partition 118 in which data is stored, and an OSPF module 116 partition in which OSPF operational instructions are stored. The OSPF module 116 partition includes an LSA origination component in which instructions for creation of LSAs are stored. The OSPF module 116 partition may also store program instructions and allow execution by the processor 122 of the program instructions to create LSAs related to one or more of the nodes 102-112. The data partition 118 may furthermore store data to be used during the execution of the program instructions.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 115. In one embodiment, the instructions are stored in memory 115 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device or signal that can store digital information. The communication adaptor 130 permits communication between the dynamic network routing device 114 and other devices or nodes coupled to the communication adaptor 130 at the communication adaptor port 134. The communication adaptor 130 may be a network interface that transfers information from nodes on a network to the dynamic network routing device 114 or from the dynamic network routing device 114 to nodes on the network. The network may be a local or wide area network, such as, for example, the Internet, the World Wide Web, or the dynamic network routing system 100 illustrated in FIG. 1. It will be recognized that the dynamic network routing device 114 may alternately or in addition be coupled directly to one or more other devices through one or more input/output adaptors (not shown).

The dynamic network routing device 114 may also be coupled to one or more output devices 126 such as, for example, a monitor or printer, and one or more input devices 128 such as, for example, a keyboard or mouse. It will be recognized, however, that the dynamic network routing device 114 does not necessarily need to have an input device 128 or an output device 126 to operate. Moreover, the storage device 124 may also not be necessary for operation of the dynamic network routing device 114.

The elements 115, 122, 124, 126, 128, and 130 of the dynamic network routing device 114 may communicate by way of one or more communication busses 132. Those busses 132 may include, for example, a system bus, a peripheral component interface bus, and an industry standard architecture bus.

A method for compiling information to be transmitted in a single packet is contemplated herein. That method includes determining space required for a unit of information that is to be transmitted in the single packet. Additional information is added to the unit of information if the size of the unit of information is not more than a maximum amount of space for information that may be transmitted in the single packet. The additional information is not added to the unit of information if the size of the unit of information is more than the maximum amount of space for information that may be transmitted in the single packet. When space for the unit of information is determined, that space may be calculated for the unit of information before or after addition of the additional information.

Figure 3:
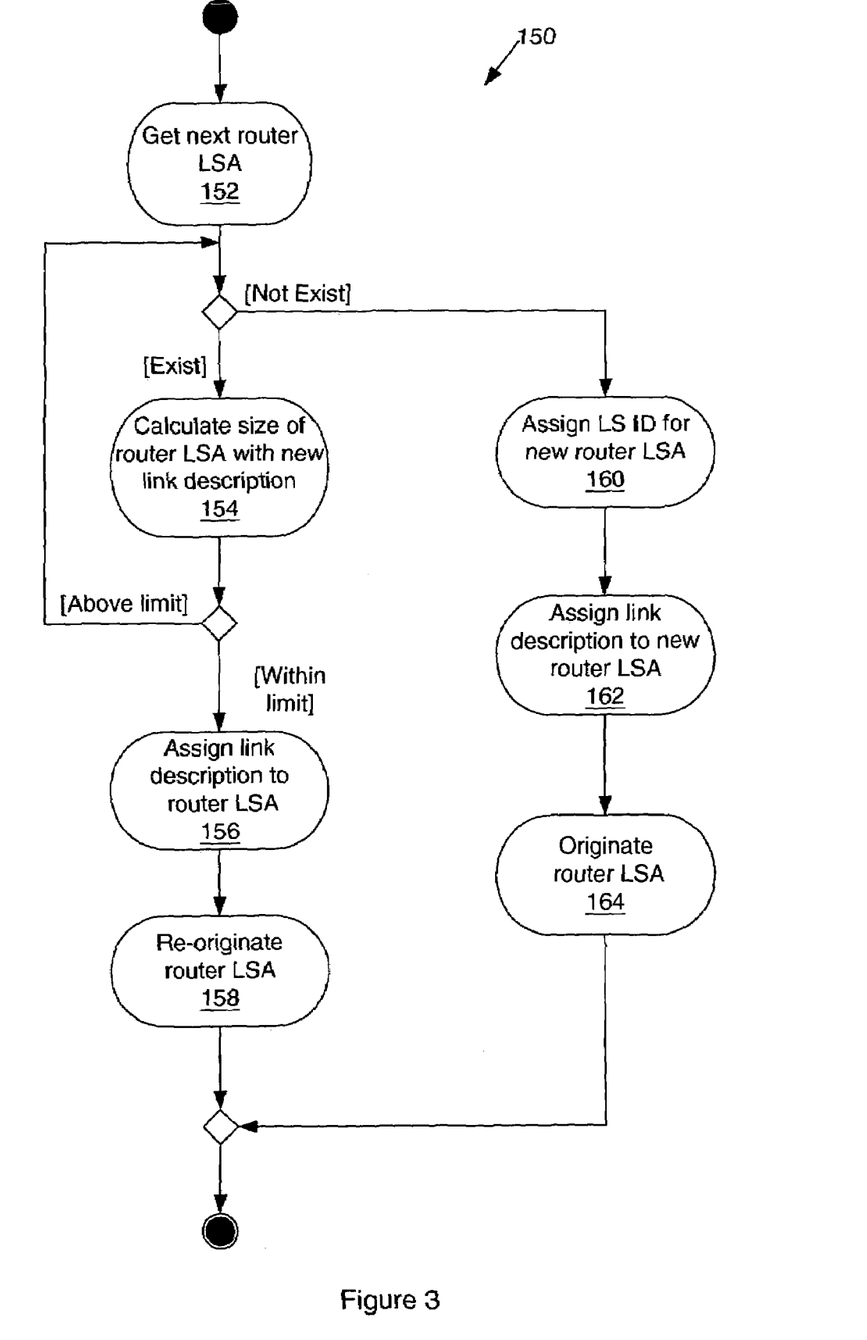
FIG. 3 is a flowchart depicting an embodiment of a method of adding a link description to a router link state advertisement.

FIG. 3 illustrates an embodiment of a link description addition method 150 by which systems and devices including those illustrated in FIGS. 1 and 2, may add a link description to a router LSA. A link description is information related to an interface. To add a link description, a self-originated router LSA that is small enough to contain another link description without the router LSA exceeding the maximum transmission unit of the messaging protocol is sought. A self-originated LSA is an LSA that was originated by the router itself. If no self-originated router LSA is small enough to contain another link description without surpassing the maximum transmission unit, a new router LSA is originated and flooded to appropriate routers such as, for example, routers within the OSPF area. If a link description is added to the router LSA, that router LSA is re-originated and flooded to appropriate routers.

The example that will be utilized to describe the link description addition method 150 will be creation of a router LSA having a size limit of 1220 bytes and that is capable of being assigned multiple link descriptions. In that way, link description addition is performed when the additional link may be added to an existing router LSA without surpassing the amount of data that may be contained in a single packet. At 152, retrieval of a self-originated router LSA is attempted. If a self-originated router LSA is retrieved, the size of the router LSA with the addition of another link description is calculated at 154. If the router LSA with the link description added is larger than the limit of 1220 bytes, retrieval of another self-originated router LSA at 152 is attempted. If the retrieved router LSA with the link description added is less than or equal to the limit of 1220 bytes, the link description is assigned to the router LSA at 156. At 158, the router LSA is re-originated to include the additional link description and addition of the link description to the LSA is complete.

If no self-originated router LSA is retrieved at 152, a link state identifier is assigned to a new router LSA at 160. At 162, a link description is assigned to the new router LSA. In that way a new router LSA that will contain one or more link descriptions will be constructed. At 164, the router LSA is originated.

It should be recognized that the link description addition method 150 may be utilized to add information other than a link description to units of limited size other than router LSAs. It should furthermore be recognized that the link description addition method 150 may be repeated to add additional link descriptions to either an existing or new router LSA. It should also be recognized that any limit that is less than or equal to the maximum transmission unit that may be transmitted in a single packet may be utilized in the link description addition method 150.

A method of removing information from a link state advertisement is also contemplated. That method includes removing a first link description from the first link state advertisement. If the first link state advertisement contains a second link description, then the first link state advertisement is originated. If the first link state advertisement does not contain a second link description and the first link state advertisement does not have the lowest link state identifier of the router link state advertisements in a particular router, then the first link state advertisement is flushed. If the first link state advertisement does not contain the second link description and the first link state advertisement has the lowest link state identifier of the router link state advertisements in the router, then a third link description may be moved from a second link state advertisement to the first link state advertisement. If the second link state advertisement contains no link description after movement of the third link state identifier, then the second link state advertisement is flushed.

Figure 4:
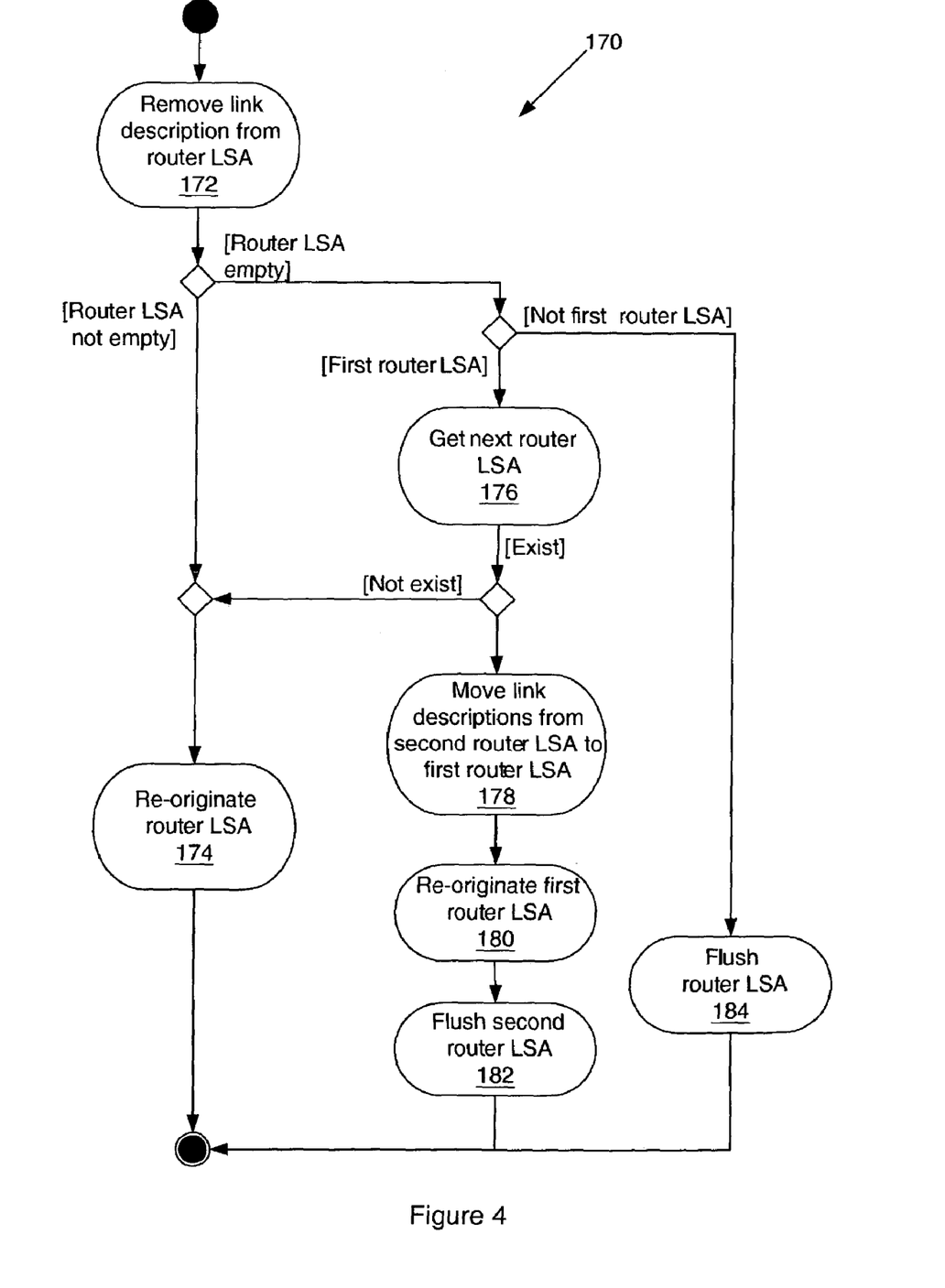
FIG. 4 is a flowchart depicting an embodiment of a method of removing a link description from a router link state advertisement.

FIG. 4 illustrates a link description removal method 170 by which embodiments, including those illustrated in FIGS. 1 and 2, may remove a link description from a router LSA. Generally, if a router LSA is not empty after the link description is removed, the LSA may be re-originated. If an LSA is empty after the link description is removed, the LSA is flushed from the OSPF routing domain.

Figure 5:
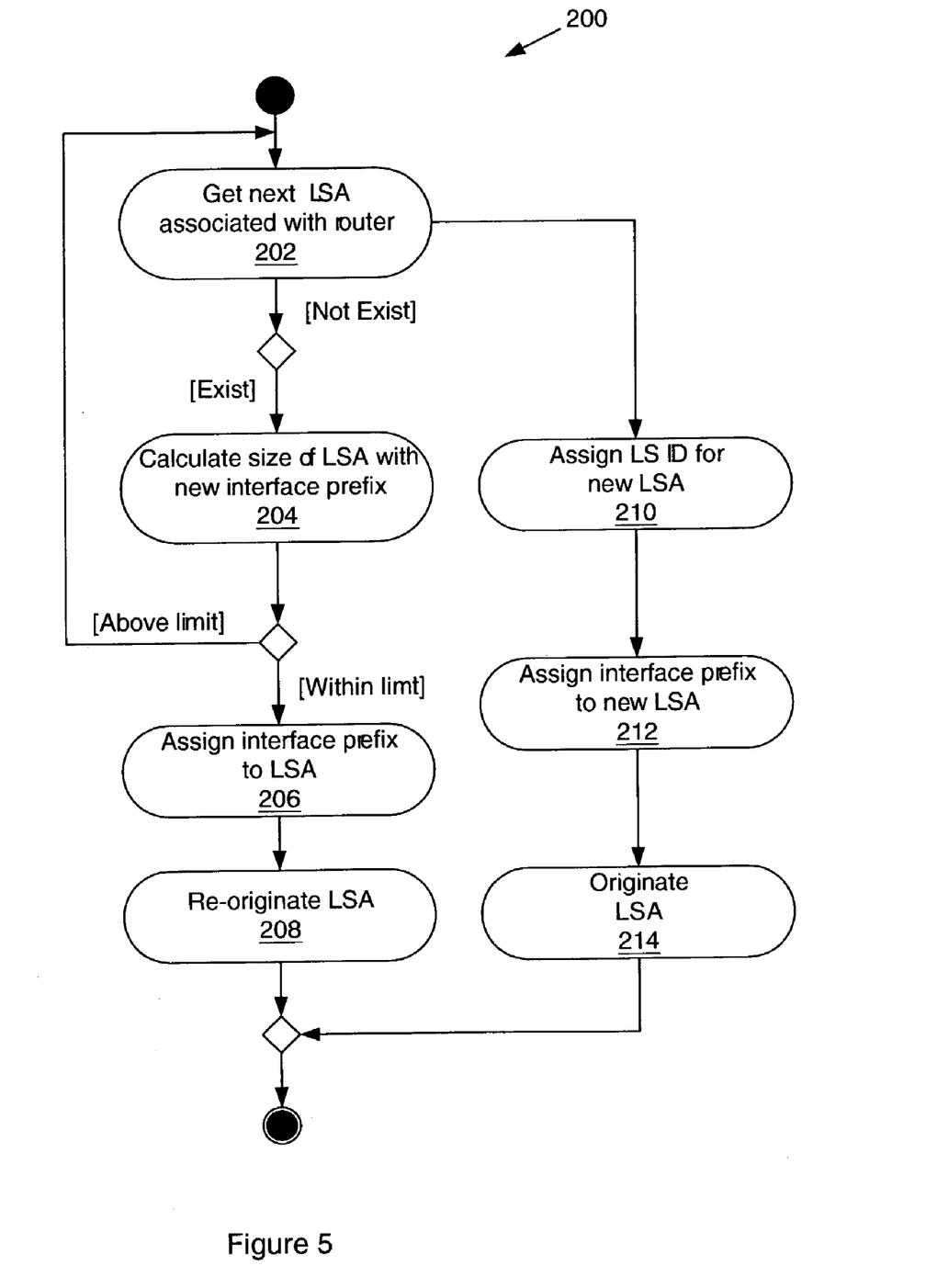
FIG. 5 is a flowchart depicting an embodiment of a method of adding intra-area-prefixes to a link state advertisement.
Figure 6:
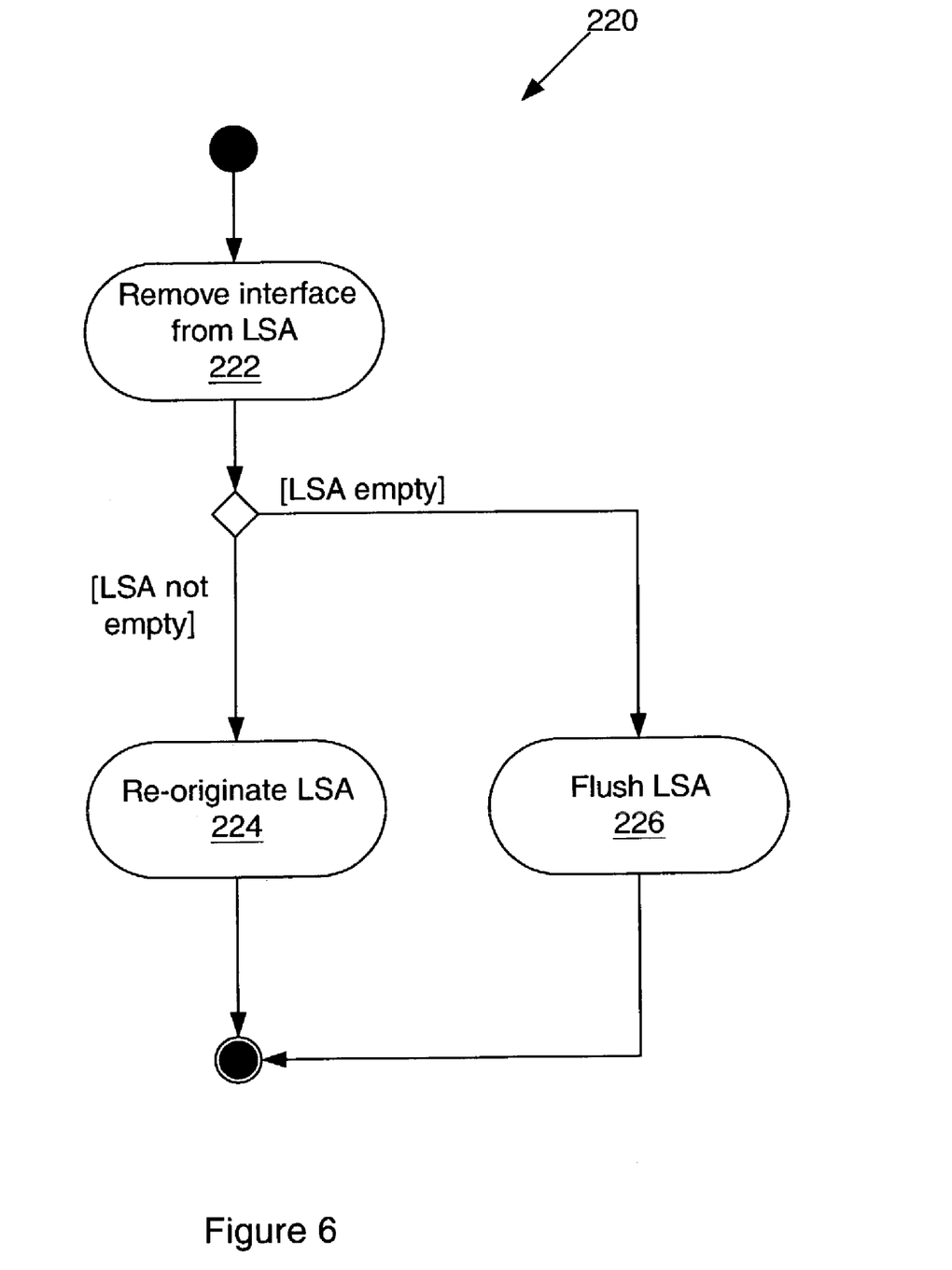
FIG. 6 is a flowchart depicting an embodiment of a method of removing intra-area-prefixes from a link state advertisement.
Figure 7:
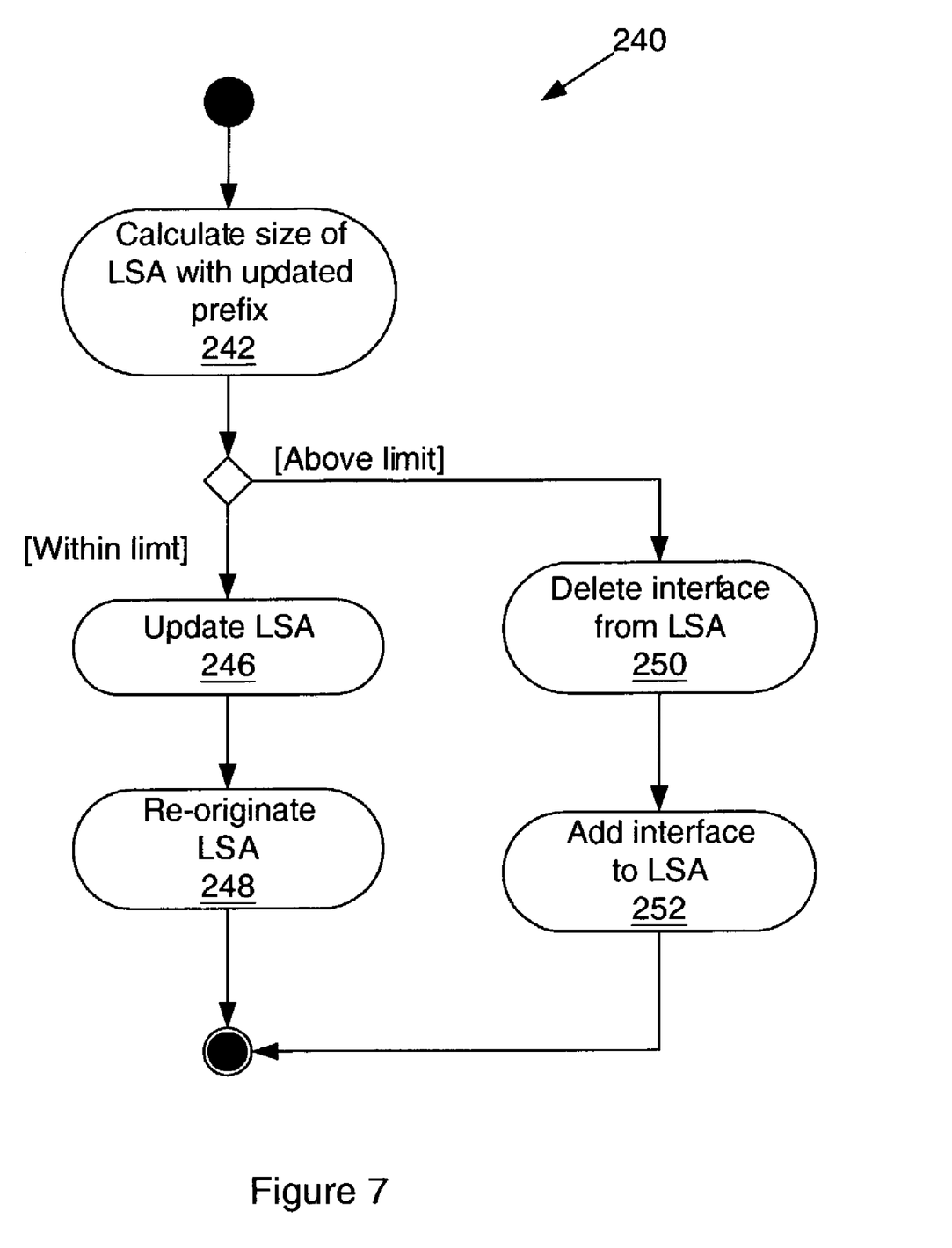
FIG. 7 is a flowchart depicting an embodiment of a method of updating interface prefixes in a link state advertisement.

The example that will be utilized to describe the link description removal method 170 of FIG. 4 and the methods illustrated in FIGS. 5-7, like the example used to illustrate FIG. 3, involves LSAs having a limit of 1220 bytes and that are capable of being assigned information related to multiple routers. At 172, a link description is attempted to be removed from an active router LSA. If the active router LSA is not empty after removal of the link, the active router LSA is re-originated at 174. Another link description may then be added, for example, utilizing the link description addition method 150 of FIG. 3.

If the active router LSA is empty after removal of the link description and the active router LSA is the first self-originated router LSA, retrieval of another self-originated router LSA is attempted at 176. The "first router LSA" may be the self-originated router LSA having the smallest link state identifier. If another self-originated router LSA does not exist, the active router LSA is re-originated at 174. If another self-originated router LSA does exist, however, one or more links in that other router LSA are moved to the active router LSA at 178. The repopulated active router LSA is then re-originated at 180. The other self-originated router LSA from which the links were moved may then be flushed at 182.

If the active router LSA is empty and the active router LSA is not the first self-originated router LSA, then the active router LSA is flushed at 184.

It should be recognized that the link description removal method 170 may be repeated to remove additional link descriptions.

Where the link description in the LSA is to be changed, the change may be made and the router LSA may be re-originated. For example, when there is a change of the router options or router type bits (such as bits W, V, E, and B) the LSA may be changed. The embodiment discussed in connection with FIG. 4 sets options and router type bits in the first self-originated router LSA and so does not flush the first self-originated router LSA, but rather places information from another router LSA into the first self-originated router LSA. Self-originated router LSAs other than the first self-originated router LSA may, however, be flushed if information is removed therefrom.

FIG. 5 illustrates an add interface prefix method 200 by which systems and devices including those illustrated in FIGS. 1 and 2 may, for example, add prefixes related to an interface to an intra-area-prefix LSA. At 202, retrieval of a self-originated LSA associated with a router is attempted. If a self-originated LSA is retrieved, the size of the LSA with the interface prefix added is calculated at 204. If the LSA with the interface prefix added is larger than the limit, retrieval of another self-originated LSA at 202 is attempted. If, however, the size of the self-originated LSA with the interface prefix added is less than or equal to the limit, one or more interface prefixes are assigned to the LSA at 206. At 208, the LSA is re-originated to include the additional interface prefix and the prefix addition is complete.

If no self-originated router is retrieved at 202, a link state identifier is assigned to form a new LSA at 210. At 212, an interface prefix may be assigned to the new LSA if it exists, and at 214 the new LSA is originated.

It should be recognized that the add interface prefix method 200 may be repeated to add additional interface prefixes to the LSA. It should also be recognized that any limit that is less than or equal to the maximum transmission unit that maybe transmitted in a single packet may be utilized.

FIG. 6 illustrates an interface prefix removal method 220 by which systems and devices including those illustrated in FIGS. 1 and 2 may, for example, remove an interface prefix from an intra-area-prefix LSA. At 222, the interface is removed from an LSA. If the LSA is not empty after removal of the interface, then the LSA is re-originated at 224. If the LSA is empty after removal of the interface, then the LSA is flushed at 226.

Of course, additional interfaces may be removed from an LSA by repeating the interface removal method 220.

FIG. 7 illustrates an interface prefix updating method 240 by which systems and devices including those illustrated in FIGS. 1 and 2 may, for example, update an interface prefix from an intra-area-prefix LSA. It should be recognized that the prefix updating method 240 may be used to update information other than interface prefix information in messages other than intra-area-prefix LSAs. At 242, the size of an LSA having its existing interface prefix information replaced by new interface prefix information is calculated. If the size of the LSA with the new information will be less than or equal to the LSA size limit, the LSA is updated at by replacing the existing information with the new information at 246 and re-originating the LSA at 248. If the size of the LSA with the new information will be greater than the LSA size limit, the existing interface prefix is removed from the LSA at 250, possibly by use of the interface prefix removal method 220 illustrated in FIG. 6. The interface prefix may then be added to another LSA at 252, possibly by use of the add interface prefix method 200 illustrated in FIG. 5.

Additional interface prefixes may be replaced in an LSA by repeating the interface prefix updating method 240.

Where multiple additions, removals, updates, or combinations thereof are desired to be performed on an LSA, origination need not be performed after each addition, removals, or update. Rather a single origination may be performed after all additions, removals, and updates are performed on a given LSA. Thus, additional efficiencies may be achieved by performing more than one addition, removal, or update and originating one time after all additions, removals, and updates have been performed.

While the link state origination systems, apparatuses, and methods have been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for compiling information to be transmitted in a single packet, comprising:
   determining space required for a unit of information that is to be transmitted in the single packet;
   adding additional information to the unit of information if the size of the unit of information is not more than a maximum amount of space for information that may be transmitted in the single packet; and
   not adding the additional information to the unit of information if the size of the unit of information is more than the maximum amount of space for information that may be transmitted in the single packet.

2. The method of claim 1, wherein determining space required for the unit of information includes determining space required for the unit of information and adding to that space required for the additional information.

3. The method of claim 1, further comprising originating a link state advertisement containing the unit of information.

4. The method of claim 1, further comprising adding a second piece of additional information to the unit of information if the unit of information size is not more than the maximum amount of space for information that may be transmitted in a single packet after addition of the second piece of additional information.

5. The method of claim 1, wherein the packet is a self-originated router link state advertisement.

6. The method of claim 1, wherein the packet is an intra-area-prefix link state advertisement.

7. The method of claim 1, wherein the information includes a link description.

8. The method of claim 1, wherein the information includes more than one link description.

9. The method of claim 1, wherein the information includes an interface prefix.

10. The method of claim 1, wherein the information includes more than one interface prefix.

11. A method for placing information in a packet, comprising:
    establishing a maximum amount of space for information that may be transmitted in a single packet;
    selecting a unit of information to be transmitted;
    calculating a packet size by adding space required for information already in the packet to space required for the unit of information to be transmitted;
    adding the unit of information to the packet if the packet size is not more than the maximum amount of space for information that may be transmitted in the single packet; and
    not adding the unit of information to the packet if the packet size is more than the maximum amount of space for information that may be transmitted in the single packet.

12. The method of claim 11, further comprising:
    selecting a second piece of information to be transmitted;
    calculating a packet size by adding space required for information already in the packet to space required for the second piece of information to be transmitted;
    adding the second piece of information to the packet if the packet size is not more than the maximum amount of space for information that may be transmitted in the single packet; and
    not adding the second piece of information to the packet if the packet size is more than the maximum amount of space for information that may be transmitted in the single packet.

13. The method of claim 11, further comprising transmitting the packet when no piece of information to be transmitted may be added to the packet without causing the packet size to be greater than the maximum amount of space for information that may be transmitted in the single packet.

14. The method of claim 11, wherein the packet is a self-originated router link state advertisement.

15. The method of claim 11, wherein the packet is an intra-area-prefix link state advertisement.

16. A method of removing information from a first link state advertisement, comprising:
    removing a first link description from the first link state advertisement;
    originating the first link state advertisement if the first link state advertisement contains a second link description;
    flushing the first link state advertisement if the first link state advertisement does not contain a second link description and the first link state advertisement does not have the lowest link state identifier of link state advertisements in a router; and
    moving a third link description from a second link state advertisement to the first link state advertisement if the first link state advertisement does not contain the second link description and the first link state advertisement has the lowest link state identifier of link state advertisements in the router.

17. The method of claim 16, further comprising flushing the second link state advertisement if the second link state advertisement does not contain a link description after the moving.

18. The method of claim 14, wherein moving the third link description from the second link state advertisement includes moving all link descriptions from the second link state advertisement.

19. A method of replacing information in a packet, comprising:
    establishing a maximum amount of space for information that may be transmitted in a single packet;
    determining space required if current information in the packet is replaced by new information;
    replacing the current information with the new information in the packet if the space required does not exceed the established maximum; and
    deleting the current information from the packet and adding the new information to a second packet if the space required does exceed the established maximum.

20. The method of claim 19, wherein the current information and the new information are interface prefixes.

21. The method of claim 19, wherein the packet is an intra-area-prefix link state advertisement.

22. A server, comprising:
    a processor containing instructions which, when executed by the processor, cause the processor to:
        determine space required for (i) a unit of information to be transmitted in a single packet and (ii) an additional piece of information,
        add the additional piece of information to the unit of information if the size of the space determined is not more than the maximum amount of space for information that may be transmitted in the single packet,
        not add the additional information to the unit of information if the size of the space determined is more than the maximum amount of space for information that may be transmitted in the single packet,
        originate the single packet containing the unit of information, and
        transmit the single packet to another server; and
    an output port coupled to said processor and through which the packet is transmitted to the other server.

23. The server of claim 22, wherein:
    the single packet is associated with a self-originated router link state advertisement; and
    the unit of information includes a link description.

24. The server of claim 22, wherein:
    the single packet is associated with an intra-area-prefix link state advertisement; and
    the unit of information includes an interface prefix.

25. A network, comprising:
    a first router coupled to a network and communicating a link state advertisement over the network, the first router having a processor, the processor having instructions that, when executed by the processor, cause the processor to:
        determine space required for a unit of information and a link description;
        add the link description to the unit of information if the space determined is not more than the maximum amount of space for information that may be transmitted in a single packet; and not add the link description to the unit of information if the space determined is more than the maximum amount of space for information that may be transmitted in the single packet;

place the unit of information in the link state advertisement; and transmit the link state advertisement; and a second router coupled to the network and receiving the link state advertisement over the network.

26. The network of claim 25, further comprising a plurality of second routers in a routing domain, wherein the plurality of second routers receive the link state advertisement.

27. An article of manufacture, comprising:

a computer readable medium having stored thereon instructions which, when executed by a processor of a first server, cause the processor to:

determine, at the processor of the first server, space required for (i) a unit of information to be transmitted in a single packet and (ii) an additional piece of information, add the additional piece of information to the unit of information if the size of the space determined is not more than the maximum amount of space for information that may be transmitted in the single packet, not add the additional information to the unit of information if the size of the space determined is more than the maximum amount of space for information that may be transmitted in the single packet, originate, at the first server, the single packet containing the unit of information, and transmit the single packet, via an output port coupled to the processor of the first server, to a second server.

28. The article of manufacture of claim 27, wherein:

the single packet is associated with a self-originated router link state advertisement; and the unit of information includes a link description.

29. The article of manufacture of claim 27, wherein:

the single packet is associated with an intra-area-prefix link state advertisement; and the unit of information includes an interface prefix.

* * * * *